(12) United States Patent
Lelyveld et al.

(10) Patent No.: US 7,953,640 B2
(45) Date of Patent: May 31, 2011

(54) METHOD AND SYSTEM FOR DETERMINING A VALUE OF A PORTION OF CONTENT

(75) Inventors: Philip Lelyveld, Culver City, CA (US); Robert Schonfeld, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1088 days.

(21) Appl. No.: 11/732,957

(22) Filed: Apr. 4, 2007

(65) Prior Publication Data

US 2008/0249892 A1 Oct. 9, 2008

(51) Int. Cl.
*G06Q 30/00* (2006.01)
(52) U.S. Cl. .......................................................... 705/26
(58) Field of Classification Search ..................... 705/26, 705/27
See application file for complete search history.

(56) References Cited

U.S. PATENT DOCUMENTS

| | | | | |
|---|---|---|---|---|
| 5,682,326 | A * | 10/1997 | Klingler et al. | 715/202 |
| 6,072,479 | A | 6/2000 | Ogawa | |
| 6,289,163 | B1 | 9/2001 | Wang | |
| 6,366,296 | B1 * | 4/2002 | Boreczky et al. | 715/719 |
| 7,254,587 | B2 * | 8/2007 | Lee et al. | 1/1 |
| 7,483,895 | B2 * | 1/2009 | Hysom et al. | 1/1 |
| 2002/0122116 | A1 * | 9/2002 | Geurts | 348/207.99 |
| 2003/0145333 | A1 | 7/2003 | Hjelsvold et al. | |
| 2007/0070196 | A1 | 3/2007 | Caviedes et al. | |
| 2007/0299873 | A1 * | 12/2007 | Jones et al. | 707/104.1 |
| 2008/0065691 | A1 * | 3/2008 | Suitts et al. | 707/104.1 |

OTHER PUBLICATIONS

Jain et al. "Metadata in Video Databases", SIGMOD Record, vol. 23, No. 4, Dec. 1994, pp. 27-33.*
Curtis et al. "Metadata—The Key to Content Management Services", IEEE 1999. Retrieved from http://www.ee.ucl.ac.uk/fstentif/curtis.htm.*

* cited by examiner

*Primary Examiner* — Naeem Haq
(74) *Attorney, Agent, or Firm* — Farjami & Farjami LLP

(57) ABSTRACT

There is provided a method for use by a computing device for determining a value of a portion of content selected by a user. The content can be, for example, a movie or a television program that includes approximately 30 frames per second. Then, data defining a beginning and an ending of the portion of content is received from the user. Metadata associated with at least one frame included in the portion of content selected by the user is processed by the computing device. For example, the metadata can include information describing the subject matter included in the frame or information indicating various attributes of the frame. Thereafter, one or more frame values are determined using the metadata. The value of the portion of content is then determined using the one or more frame values.

20 Claims, 3 Drawing Sheets

METHOD AND SYSTEM FOR DETERMINING A VALUE OF A PORTION OF CONTENT

BACKGROUND OF THE INVENTION

1. Field of the Invention

The present invention relates generally to determining a value for content. More particularly, the present invention relates to techniques for determining the value of a user selected portion of content.

2. Background Art

Content suppliers typically license their content to third parties for personal or commercial use. For example, a content supplier may license a portion of content, such as a memorable scene from a recent smash hit movie, to an advertising agency planning to use the scene in a television advertisement to attract a larger audience. In another example, a content supplier may license portions of content to individuals who may wish to use the content in entertaining video compilations and parodies, such as video "mash-ups." Such commercial and private uses for content, coupled with the convenience and accessibility of the Internet, have created a rapidly growing market for the licensing of content. As such, the licensing of content has emerged as an important source of revenue for content suppliers.

One conventional technique used by content suppliers for valuing a portion of content involves the use of a uniform fee for a particular duration of the content. For example, a user wishing to license a portion of a particular movie can visit a Website maintained by the content supplier and can select from one of a number of preselected clips from the movie that are available for licensing. Each clip can then be downloaded from the Website, for example, for a licensing fee determined by the duration of the clip and not by other factors, such as the subject matter included in the movie clip. As such, the conventional technique for valuing portions of content may undesirably result in a loss of revenue to content suppliers since the licensing fees may be too low for some portions of the content, e.g., portions of the content having a high production value.

SUMMARY OF THE INVENTION

There is provided methods and systems for determining a value of a portion of content, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
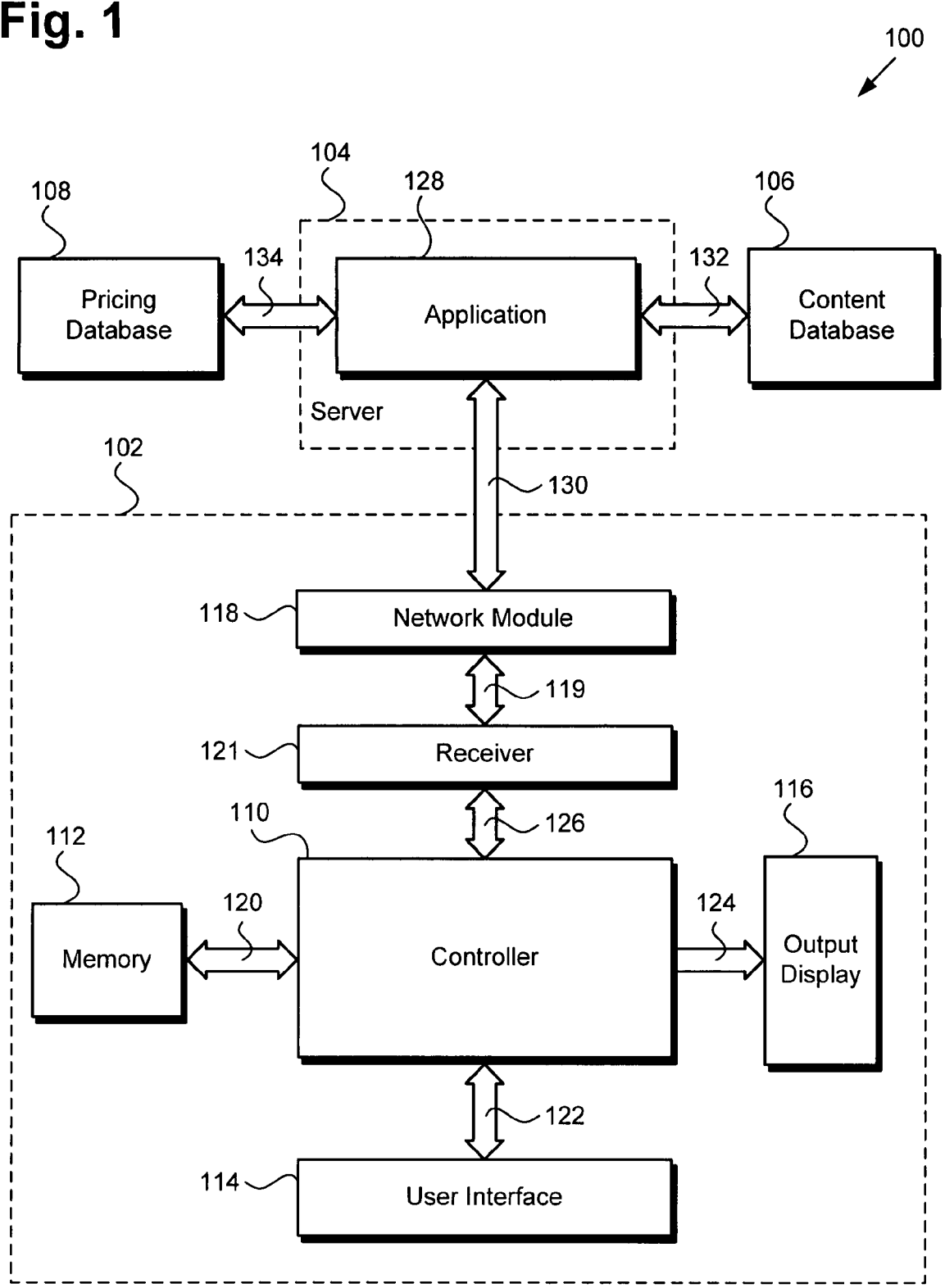
FIG. 1 illustrates a block diagram of a system for determining a value of a portion of content selected by a user in accordance with one embodiment of the invention.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

FIG. 1 illustrates a block diagram of a system for determining a value of a portion of content selected by a user in accordance with one embodiment of the invention. System 100 includes computing device 102, server 104, content database 106, and pricing database 108. As shown in FIG. 1, computing device 102 includes controller 110, which can be, for example, a microcontroller or a microprocessor. As further shown in FIG. 1, computing device 102 includes memory 112, user interface 114, output display 116, and receiver 121 coupled to controller 110 via buses 120, 122, and 124, and 126 respectively. As shown in FIG. 1, computing device 102 further includes network module 118 coupled to receiver 121 via bus 119. Memory 112 and receiver 121 can each be, for example, a volatile or non-volatile memory device and output display 116 can be a monitor or a liquid crystal display ("LCD"). User interface 114 can include at least one input device, such as a keypad, keyboard, or a mouse. Network module 118 can be, for example, an Ethernet adapter or a Wi-Fi module. Computing device 102 in FIG. 1 can be, for example, a personal computer, a personal digital assistant ("PDA"), a portable media player ("PMP"), or a cellular telephone.

As shown in FIG. 1, computing device 102 can access application 128 in server 104 via data path 130. Server 104 can be, for example, a Web server and application 128 can be a Web application. In one embodiment, computing device 102 can receive application 128 from server 104 and can execute application 128 after storing application 128 in memory 112. As further shown in FIG. 1, application 128 can access content database 106 via data path 132 and pricing database 108 via data path 134. In one embodiment, content database 106 is configured to store various content which can be accessed and viewed by a user of computing device 102. For example, the content can be a movie, a television program, an animation, a music video, or an advertisement.

Figure 2:
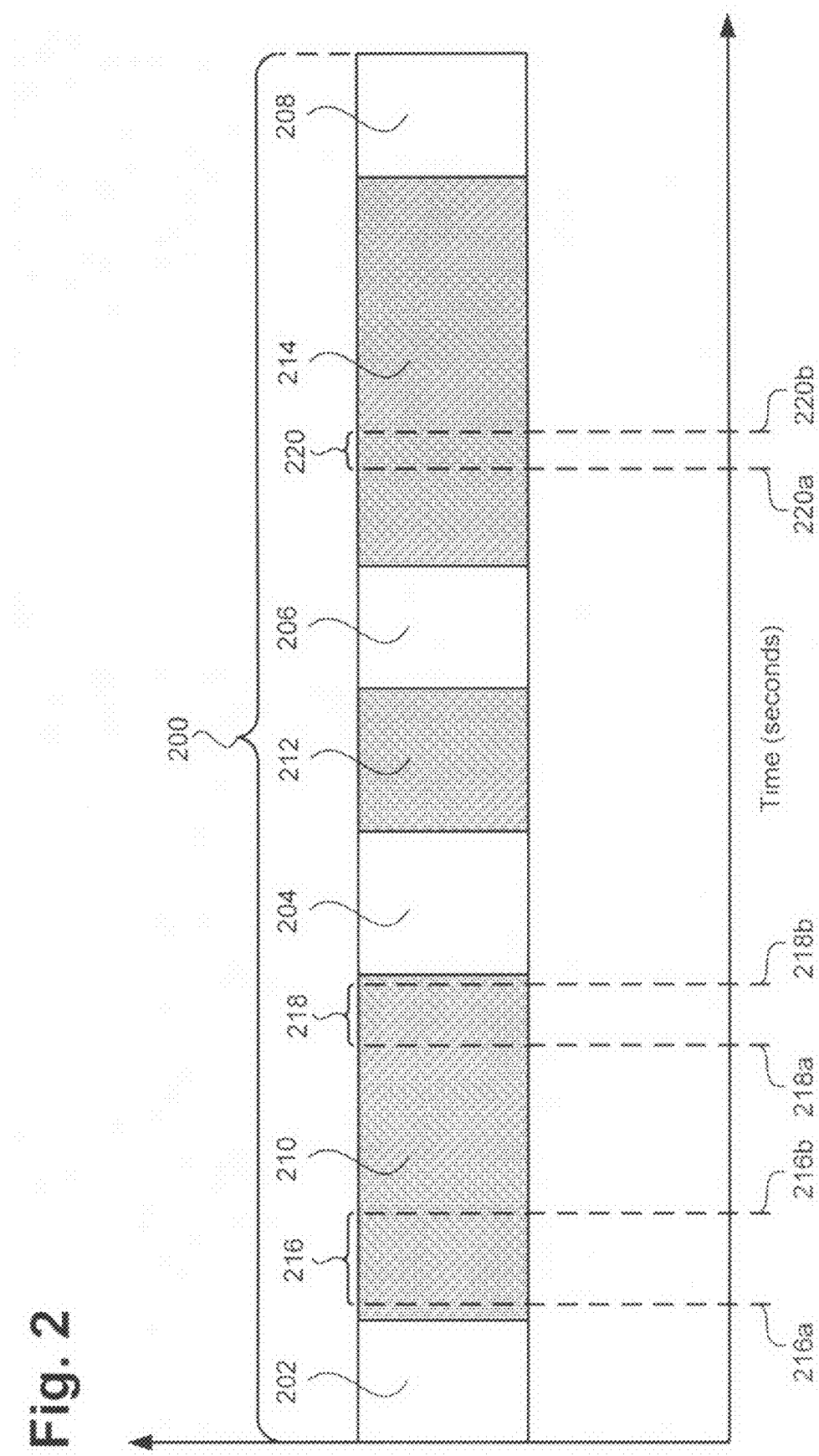
FIG. 2 illustrates an example content in accordance with one embodiment of the invention.

FIG. 2 illustrates an example content in accordance with one embodiment of the invention. Content 200 shown in FIG. 2 can be, for example, a two hour movie that includes approximately 30 frames per second. In one embodiment, content 200 can be stored in content database 106 shown in FIG. 1. As shown in FIG. 2, content 200 includes shaded portions, such as shaded portions 210, 212, and 214, and non-shaded portions, such as non-shaded portions 202, 204, 206, and 208. The shaded portions of content 200 represent user selectable portions of content 200 that a user may select using computing device 102. The non-shaded portions represent non-selectable portions of content 200 that may not be selected by a user, but which may be viewed by a user of computing device 102. For example, the non-shaded portions of content 200 might include content that cannot be licensed to third parties.

However, the non-shaded portions of content 200 can be viewed by a user to provide context for the shaded portions of content 200, which may be selected by a user.

Thus, a user interested in licensing a portion of content 200 may utilize user interface 114 in FIG. 1 and application 128 described above to access content 200 stored in content database 106. For example, application 128 can be received by computing device 102 in receiver 121 via data path 130 and network module 118. Computing device 102 can then execute application 128 to receive content 200, e.g., in receiver 121, from content database 106. Computing device 102 can then display content 200 in a variable size "window" on output display 116 of computing device 102. During periods when the user selectable portions of content 200 are being displayed, i.e., the shaded portions of content 200, a user may select a portion of content 200 by inputting data that defines a beginning and an ending of a portion of content 200. For example, as shown in FIG. 2, a user may select portion 216 of content 200 by indicating a beginning, such as beginning point 216a, and an ending, such as ending point 216b. The beginning and ending points can be indicated by a user using user interface 114 described above. For example, a user may click a mouse a first time to indicate beginning point 216a of portion 216 and a second time to indicate ending point 216b of portion 216. In one embodiment, the beginning point can be defined by the initial frame in the user selected portion of content, e.g., portion 216, and the ending point be defined by the final frame in the user selected portion of content.

In one embodiment, each of the frames included in the shaded portions of content 200 can be associated with metadata. For example, the metadata can include information describing the subject matter included in the frame, such as the production value of the frame. For example, the production value of the frame can include various factors, such as the number of actors featured in the frame, the caliber of the actors, the cost of the set and props featured in the frame, and the stunts performed in the frame. Moreover, the production value can include promotional factors, such as the appearance of branded elements in the frame, e.g., a "Walt Disney" logo, third party advertisements, the use of product placement strategies in the frame, and the usage of the frame, e.g., commercial or private. The metadata can also include, for example, information indicating various attributes of the frame, such as the quality of the frame. The attributes of the frame can include, for example, the resolution of the frame, e.g., standard definition or high definition, and the format of the frame, e.g., Audio Video Interleave ("AVI") or Moving Picture Experts Group ("MPEG"). In one embodiment, the metadata associated with each frame can be represented by a number of frame parameters. In such an embodiment, each frame parameter can be assigned a numerical value on a predetermined scale, such as an integer scale ranging from 1 to 10, to describe the subject matter and attributes of the frame. Alternatively, a frame parameter may be assigned, for example, one of two possible values, such as a "0" or a "1", to indicate the presence or absence of an attribute.

For example, one frame in a portion of content selected by a user, e.g., portion 216 in FIG. 2, may include an elaborate set and an actor of high caliber, while another frame may include a view of a desert and an actor of low caliber. As such, the metadata associated with each frame may include frame parameters such as "value of set" and "value of actor." The numerical value assigned to each frame parameter, however, might vary based on the specific content included in the frame and/or other attributes of the frame. Thus, in the example above, the "value of set" frame parameter associated with the frame including the elaborate set might be assigned a numerical value of "9" to reflect the high cost of the set featured in the frame and the "value of actor" frame parameter might be assigned a numerical value of "10," to reflect the value of the actor of high caliber featured in the frame. With respect to the frame that includes a view of the desert and the low caliber actor, the "value of set" frame parameter might be assigned a numerical value of "1" to reflect the simplicity of the set and the "value of actor" frame parameter might be assigned a numerical value of "2," to reflect the low caliber of the actor featured in the frame.

Each of the frames discussed above may further include one or more frame parameters describing various attributes of the frame. For example, a "resolution" frame parameter may be associated with each frame to indicate whether the frame is in standard definition or in high definition. As another example, a "format" frame parameter may be associated with each frame to indicate the format type of each frame. In one embodiment, such frame parameters describing various attributes of the frame can be selected by a user. For example, application 128 can be configured to prompt a user for the desired resolution and format of portion 216 upon selection by the user. The user may then input the desired format and resolution information via user interface 114. Each frame parameter, e.g., the "format" frame parameter and the "resolution" frame parameter, can also be assigned a numerical value on a predetermined scale as discussed above, such as an integer scale ranging from 1 to 10. In one embodiment, superior frame attributes and higher production values can be indicated with higher numerical values. For example, if portion 216 is in high definition, then the "resolution" frame parameter might be assigned a numerical value of "10," whereas if portion 216 is in standard definition, the "resolution" frame parameter might be assigned a lower numerical value of "5."

Pricing database 108 can be configured to store a number of price figures, which correspond to the frame parameters and the numerical values included in the metadata. For example, and in accordance with the example provided above, the frame parameter "value of set" having an assigned numerical value of "1" can be correlated to a price figure of $0.02 whereas the frame parameter "value of set" having an assigned numerical value of "9" can be correlated to a price figure of $0.50. Furthermore, the frame parameter "value of actor" having an assigned numerical value of "2" can be correlated to a price figure of $0.05 whereas the frame parameter "value of actor" having an assigned numerical value of "10" can be correlated to a price figure of $0.75.

Once a user has selected a portion of content 200, e.g., portion 216, application 128 shown in FIG. 1 can be configured to dynamically determine the value of the selected portion of content 200. Thus, in one embodiment, controller 110 can be configured to execute application 128, which can be configured to process the metadata associated with each frame in portion 216 of content 200 to determine the frame parameters associated with each frame and the numerical value assigned to each frame parameter. Application 128 can be further configured to use the frame parameters and the numerical values to determine a price figure for each frame parameter. For example, application 128 can access pricing database 108 and can determine the price figure corresponding to each frame parameter and the assigned numerical value. Since, in one embodiment, the price figures corresponding to the frame parameters reside in a separate database, i.e., pricing database 108, it should be appreciated that the price figures can dynamically change over time to achieve accurate and up to date price figures without having to manipulate the metadata associated with each frame.

In one embodiment, application 128 can be configured to determine a frame value (i.e., the monetary value of a frame) for each frame in portion 216 of content 200. For example, application 128 can determine a frame value by summing the price figures corresponding to the frame parameters associated with a frame. Thus, in the example provided above, the frame including the elaborate set and the actor of high caliber would have a greater frame value than the frame including the actor of low caliber.

In one embodiment, the frame values can be summed by application 128 to determine a value, such as a monetary value, of the selected portion of content 200. In another embodiment, application 128 can be configured to determine the value of a group of frames in portion 216 of content 200. For example, application 128 can be configured to determine a single value for a group of 30 frames using the frame parameters and the corresponding price figures described above. Thus, since each second of portion 216 can include approximately 30 frames, each second of portion 216 can be independently valued by application 128 based on the specific content and various attributes of the frames included therein.

Therefore, once a portion of content 200 is selected by a user, application 128 can dynamically determine the value of the portion of content based on the subject matter and the attributes of the frames included therein using the abovementioned techniques. For example, referring to FIG. 2, the user may initially select portion 216 shown in FIG. 2. Application 128 can be configured to dynamically determine the value of portion 216 using the abovementioned frame parameters and pricing figures and can communicate the value of content portion 216 to the user. If the user desires to complete a transaction, the user may be required to pay the communicated value of content portion 216 to acquire licensing rights for the use of content portion 216. If, however, the user prefers a portion of content 200 having a lesser or greater value, the user may immediately select another portion of content 200, such as portion 218 by defining beginning point 218a and ending point 218b, or portion 220 by defining beginning point 220a and ending point 220b. Thus, it should be noted that a user might select any portion within the shaded portions of content 200 by appropriately defining beginning and ending points. Application 128 can then dynamically determine the value of the selected portions of content 200, e.g., portions 216, 218, or 220, using the abovementioned frame parameters and pricing figures and can communicate the value of the selected portion of content to the user. In another embodiment, the user may input a value using interface 114 and application 128 can determine various portions of content 200 which have a value equal to the value input by the user.

Figure 3:
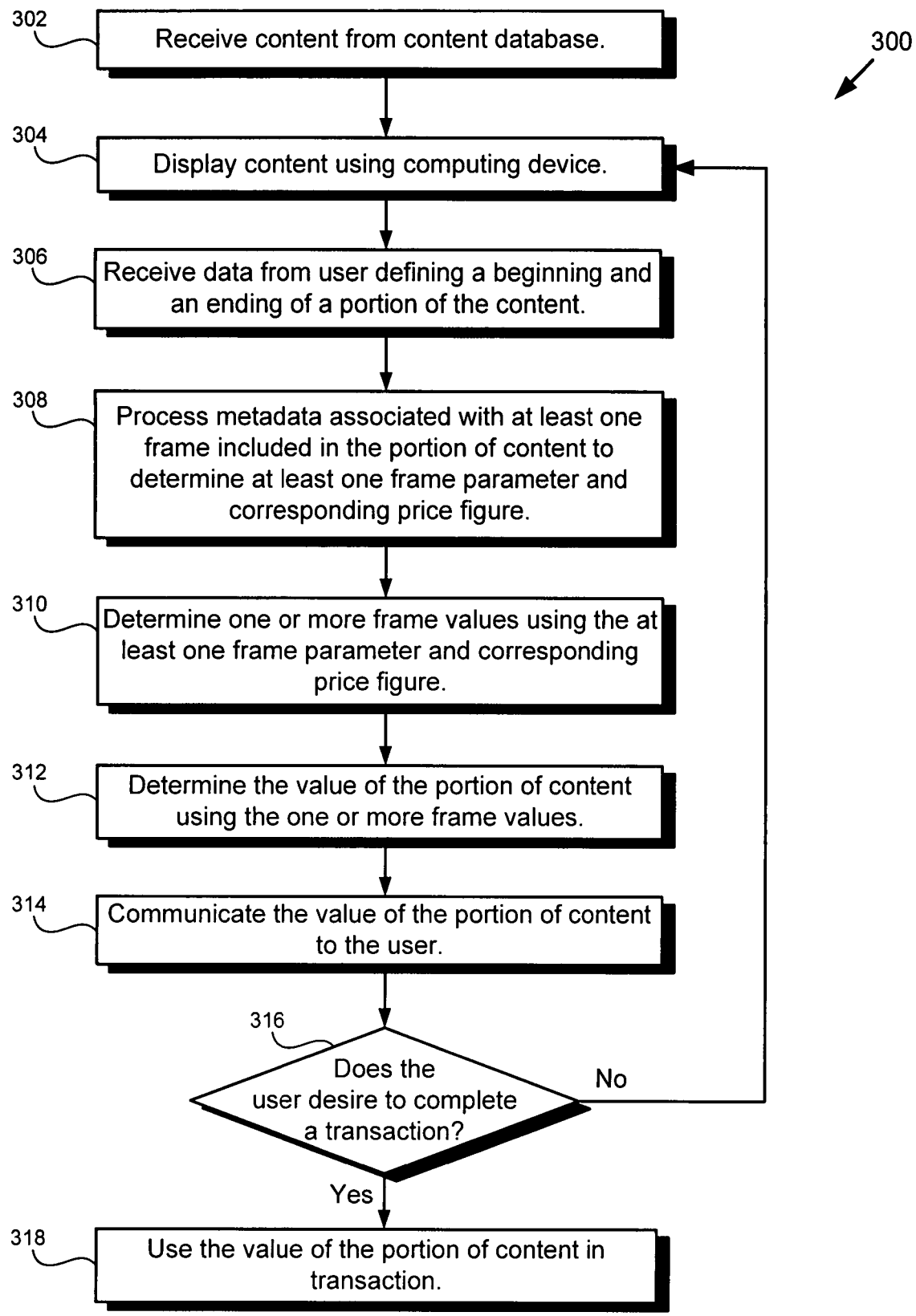
FIG. 3 shows a flowchart of a method for determining a value of a portion of content in accordance with one embodiment of the invention.

FIG. 3 shows a flowchart for performing method 300 for determining a value of a portion of content in accordance with one embodiment of the invention. As shown in FIG. 3 and with reference to FIGS. 1 and 2, at step 302 of flowchart 300, content 200 stored in content database 106 is received by computing device 102. At step 304, the content is displayed using computing device 102. At step 306, data from a user defining a beginning (e.g., beginning point 216a) and an ending (e.g., ending point 216b) of a portion of content 200 (e.g., portion 216) is received. At step 308, metadata associated with at least one frame included in the portion of content 200 is processed, e.g., by controller 110, to determine at least one frame parameter and corresponding price figure. At step 310, one or more frame values are determined using the at least one frame parameter and corresponding price figure. Thereafter, at step 312, the value of the portion of content 200 is determined using the one or more frame values. At step 314, the value of the portion of content is communicated to the user. At step 316, it is determined whether the user desires to complete a transaction. If the user does desire to complete a transaction, then at step 318, the value of the portion of content is used in the transaction. Otherwise, step 304 is repeated.

Thus, by valuing a portion of content selected by a user, e.g., portion 216, based on the subject matter and the attributes of the frames included therein, a more accurate value of the portion of content selected by a user can be determined. Consequently, content suppliers can increase revenue by valuing portions of content having high production values and superior attributes greater than portions of content having low production values and moderate attributes. Moreover, the present invention allows greater flexibility in defining and valuing a portion of content over conventional techniques, since a user is not restricted to preselected portions of content determined by the content supplier.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for use by a computing device for determining a value of a first portion of a content selected by a user, said method comprising:
   displaying said content using said computing device;
   receiving, using said computing device, data from said user defining a beginning and an ending of said first portion of said content selected by said user, wherein said content has a second portion not selected by said user;
   processing, using said computing device, metadata associated with one or more frames included in said first portion of said content;
   determining, using said computing device, one or more frame values of said first portion of said content using said metadata, wherein at least a first frame in said content has a higher frame value than a second frame in said content, as determinable based on associated metadata with each of said first frame and said second frame;
   determining, using said computing device, said value of said first portion of said content using said one or more frame values.

2. The method of claim 1 further comprising:
   communicating said value of said first portion of said content to said user;
   using said value of said first portion of said content in a transaction.

3. The method of claim 1 wherein said metadata includes at least one frame parameter.

4. The method of claim 3 wherein said at least one frame parameter corresponds to a price figure.

5. The method of claim 3 wherein said at least one frame parameter indicates a production value of said at least one frame.

6. The method of claim 3 wherein said at least one frame parameter indicates an attribute of said at least one frame.

7. The method of claim 6 wherein said attribute of said at least one frame is selected by said user.

8. The method of claim 1 wherein said value of said first portion of content is a monetary value.

9. The method of claim 1 wherein said computing device is one of a personal computer, a personal digital assistant ("PDA"), a portable media player ("PMP"), or a cellular telephone.

10. The method of claim 1 wherein said content is one of a movie, a television program, an animation, a music video, or an advertisement.

11. The method of claim 1 further comprising receiving said content from a content database prior to displaying said content.

12. A computing device for determining a value of a first portion of a content selected by a user, said computing device comprising:
   a receiver for receiving said content from a content database;
   an output display for displaying said content;
   a user interface for receiving data from said user defining a beginning and an ending of said first portion of said content selected by said user, wherein said content has a second portion not selected by said user;
   a controller for processing metadata associated with one or more frame included in said first portion of said content;
   wherein said controller is configured to determine one or more frame values of said first portion of said content using said metadata and to determine said value of said first portion of said content using said one or more frame values, wherein at least a first frame in said content has a higher frame value than a second frame in said content, as determinable based on associated metadata with each of said first frame and said second frame.

13. The computing device of claim 12 wherein said metadata includes at least one frame parameter.

14. The computing device of claim 13 wherein said at least one frame parameter corresponds to a price figure.

15. The computing device of claim 13 wherein said at least one frame parameter indicates a production value of said at least one frame.

16. The computing device of claim 13 wherein said at least one frame parameter indicates an attribute of said at least one frame.

17. The computing device of claim 16 wherein said attribute of said frame is selected by said user.

18. The computing device of claim 12 wherein said computing device is one of a personal computer, a personal digital assistant ("PDA"), a portable media player ("PMP"), or a cellular telephone.

19. The computing device of claim 12 wherein said content is one of a movie, a television program, an animation, a music video, or an advertisement.

20. The computing device of claim 12 wherein each second of said content includes approximately 30 frames.

* * * * *